United States Patent
Chen et al.

(10) Patent No.: US 11,777,858 B2
(45) Date of Patent: Oct. 3, 2023

(54) METHOD, ELECTRONIC DEVICE, AND COMPUTER PROGRAM PRODUCT FOR DATA TRANSMISSION

(71) Applicant: EMC IP Holding Company LLC, Hopkinton, MA (US)

(72) Inventors: Qiang Chen, Shanghai (CN); Zhenzhen Lin, Shanghai (CN); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 17/182,442

(22) Filed: Feb. 23, 2021

(65) Prior Publication Data

US 2022/0247689 A1 Aug. 4, 2022

(30) Foreign Application Priority Data

Jan. 29, 2021 (CN) .......................... 202110129568.3

(51) Int. Cl.
*H04L 47/24* (2022.01)
*H04L 43/0882* (2022.01)

(52) U.S. Cl.
CPC .......... *H04L 47/24* (2013.01); *H04L 43/0882* (2013.01)

(58) Field of Classification Search
CPC ............................ H04L 47/24; H04L 43/0882
See application file for complete search history.

(56) References Cited

U.S. PATENT DOCUMENTS

| 2018/0013635 | A1* | 1/2018 | Acharya | H04L 43/0829 |
| 2020/0372322 | A1* | 11/2020 | Wang | G08G 1/0112 |
| 2021/0105517 | A1* | 4/2021 | Cho | H04N 21/23406 |
| 2021/0336886 | A1* | 10/2021 | Vijayasankar | H04L 43/0882 |
| 2021/0377804 | A1* | 12/2021 | Sivaraj | H04W 28/10 |
| 2022/0094733 | A1* | 3/2022 | Magzimof | H04L 43/087 |

OTHER PUBLICATIONS

Wikipedia, "Internet of Vehicles," https://er.wikipedia.org/w/index.php?title=Internet_of_vehicles&oldid=998331798, Jan. 4, 2021, 3 pages.

(Continued)

*Primary Examiner* — Donald L Mills
(74) *Attorney, Agent, or Firm* — Ryan, Mason & Lewis, LLP

(57) ABSTRACT

Embodiments of the present disclosure relate to a method, an electronic device, and a computer program product for data transmission. In one embodiment, a method includes: receiving a plurality of types of data at a first device from a plurality of data sources, each type of data having a corresponding data transmission configuration; determining a first predicted network bandwidth for transmitting data from the first device to a second device in a first time window period in the future; determining a first piece of configuration information for transmitting the plurality of types of data in the first time window period based on the first predicted network bandwidth and a plurality of data transmission configurations corresponding to the plurality of types of data; and transmitting the received plurality of types of data to the second device in the first time window period based on the first piece of configuration information.

20 Claims, 5 Drawing Sheets

(56) References Cited

OTHER PUBLICATIONS

Wikipedia, "Autoregressive Integrated Moving Average," https://en.wikipedia.org/w/index.php?title=Autoregressive_integrated_moving_average&oldid=1007638826, Feb. 19, 2021, 8 pages.
Wikipedia, "Linear Programming," https://en.wikipedia.org/w/index.php?title=Linear_programming&oldid=992098657, Dec. 3, 2020, 19 pages.

* cited by examiner

METHOD, ELECTRONIC DEVICE, AND COMPUTER PROGRAM PRODUCT FOR DATA TRANSMISSION

RELATED APPLICATION(S)

The present application claims priority to Chinese Patent Application No. 202110129568.3, filed Jan. 29, 2021, and entitled "Method, Electronic Device, and Computer Program Product for Data Transmission," which is incorporated by reference herein in its entirety.

FIELD

Embodiments of the present disclosure generally relate to data transmission, and specifically to a method, an electronic device, and a computer program product for data transmission.

BACKGROUND

In the upcoming era of the Internet of Vehicles (IoV), there are new opportunities to completely change Information Technology (IT) infrastructures in many ways. New challenges, such as efficient transmission, processing, and storage of a large volume of data, have also emerged. These challenging tasks need to be completed in a significantly changing network environment. For example, a connection between a vehicle and a base station and a network bandwidth usually change significantly during driving. This is not frequently seen in a conventional IT infrastructure. Therefore, data transmission by a conventional approach is inefficient.

SUMMARY

Embodiments of the present disclosure provide a method, an electronic device, and a computer program product for data transmission.

In a first aspect of the present disclosure, a method for data transmission is provided. The method includes: receiving a plurality of types of data at a first device from a plurality of data sources, each type of data having a corresponding data transmission configuration; determining a first predicted network bandwidth for transmitting data from the first device to a second device in a first time window period in the future; determining a first piece of configuration information for transmitting the plurality of types of data in the first time window period based on the first predicted network bandwidth and a plurality of data transmission configurations corresponding to the plurality of types of data; and transmitting the received plurality of types of data to the second device in the first time window period based on the first piece of configuration information.

In a second aspect of the present disclosure, an electronic device is provided. The device includes at least one processing unit and at least one memory. The at least one memory is coupled to the at least one processing unit and stores an instruction for execution by the at least one processing unit. The instruction, when executed by the at least one processing unit, causes the device to execute an action. The action includes: receiving a plurality of types of data at a first device from a plurality of data sources, each type of data having a corresponding data transmission configuration; determining a first predicted network bandwidth for transmitting data from the first device to a second device in a first time window period in the future; determining a first piece of configuration information for transmitting the plurality of types of data in the first time window period based on the first predicted network bandwidth and a plurality of data transmission configurations corresponding to the plurality of types of data; and transmitting the received plurality of types of data to the second device in the first time window period based on the first piece of configuration information.

In a third aspect of the present disclosure, a computer program product is provided. The computer program product is tangibly stored on a non-transitory computer-readable medium and includes a machine-executable instruction. The machine-executable instruction, when executed, causes a machine to implement any step of the method according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

Identical or corresponding reference numerals in the figures represent identical or corresponding portions.

DETAILED DESCRIPTION

Figure 1:
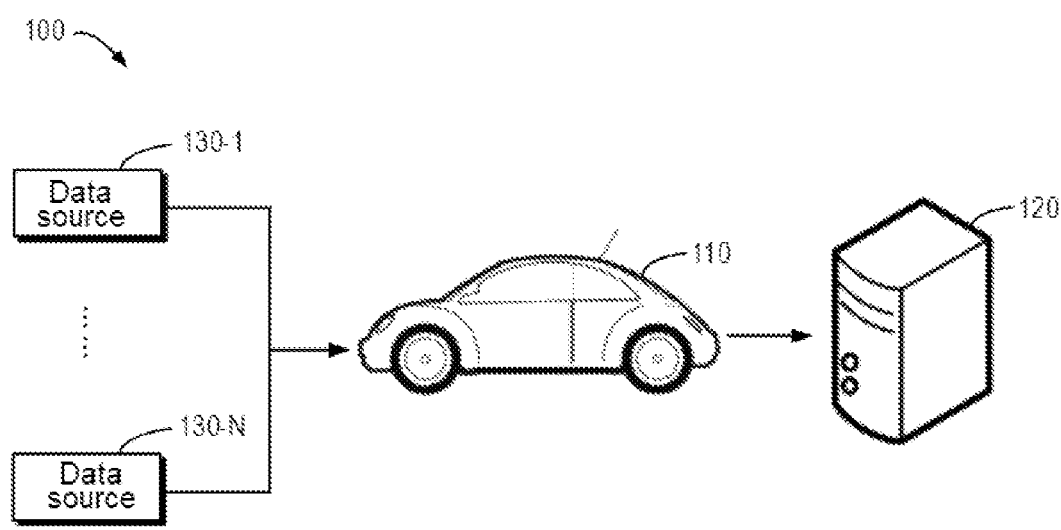
FIG. 1 shows a schematic diagram of an example data transmission environment in which some embodiments of the present disclosure can be implemented.

Illustrative embodiments of the present disclosure will be described in more detail below with reference to the accompanying drawings. While the illustrative embodiments of the present disclosure are shown in the accompanying drawings, it should be understood that the present disclosure can be implemented in various forms without being limited to the embodiments set forth herein. In contrast, these embodiments are provided to make the present disclosure more thorough and complete, and fully convey the scope of the present disclosure to those skilled in the art.

The term "including" and variants thereof used herein denote open-ended inclusion, i.e., "including, but not limited to." Unless otherwise specifically stated, the term "or" denotes "and/or." The term "based on" denotes "at least partially based on." The terms "an example embodiment" and "an embodiment" denote "at least one example embodiment." The term "another embodiment" denotes "at least one additional embodiment." The terms "first," "second," and the like may refer to different or identical objects. Other explicit and implicit definitions may be further included below.

The Internet of Vehicles (IoV) is a fusion of the mobile Internet and the Internet of Things (IoT), in which vehicles act as intelligent mobile nodes or objects in a sensing network. An IoV ecosystem may provide services for intelligent transportation applications to guide and supervise vehicles, and provide abundant multimedia and mobile Internet application services. The IoV can support information sharing and big data collection of vehicles, infrastructures, and surrounding environments thereof. Therefore, data may be transmitted to an edge server for simpler data analysis. Then, the data may be transmitted to a cloud or a data center through a core network for more complex data analysis.

However, a conventional data transmission solution cannot solve problems in three aspects as follows. In a first aspect, a vehicle has a plurality of sensors. Different types of data from different sensors have different data transmission configurations. For example, a data volume of traffic data is relatively small, but the traffic data is used for monitoring real-time traffic, and therefore, the traffic data has a short valid period (e.g., 5 minutes), and is required to be transmitted in a short time. A data volume of multimedia data is relatively large, but the multimedia data is only used for artificial intelligence and other training, and therefore, the multimedia data has a long valid period (e.g., 1 day). Traditionally, simple first-in first-out logic is usually used for data transmission. This data transmission mode very easily violates the data transmission configurations. For example, transmission of the multimedia data may consume most of a network bandwidth, and block transmission of traffic data with higher timeliness requirements.

In a second aspect, a vehicle during driving is in a very unstable network environment. In this network environment, network states, such as a connectivity and network bandwidth, are constantly changing, thus resulting in failure to accurately predict a long-term network environment in the future, such that a data transmission plan determined based on a current network environment generally fails to adapt to the long-term network environment in the future.

In a third aspect, as described above, since the network environment is constantly changing, it is impossible to determine a data transmission plan adaptable to the long-term network environment in the future. Therefore, it is necessary to re-determine the data transmission plan regularly and/or as required to quickly adapt to changes of the network environment. For example, a data transmission plan for the next 1 hour may be determined, but it may be necessary to readjust the data transmission plan every 10 minutes due to cumulative errors of the predicted network environment. However, determining the data transmission plan can be completed only after a computing device with powerful functions runs for a long time (e.g., a few minutes or even a few hours). Therefore, the data transmission plan is required to be determined in a simpler way.

According to an example embodiment of the present disclosure, an improved solution for data transmission is presented. In this solution, a first device may receive a plurality of types of data from a plurality of data sources. Each type of data has a corresponding data transmission configuration. The first device may determine a first predicted network bandwidth for transmitting data from the first device to a second device in a first time window period in the future. Further, the first device may determine a first piece of configuration information for transmitting the plurality of types of data in the first time window period based on the first predicted network bandwidth and a plurality of data transmission configurations corresponding to the plurality of types of data. Therefore, the first device may transmit the received plurality of types of data to the second device in the first time window period based on the first piece of configuration information.

Thus, instead of allowing a low-level network controller to decide which pieces of data are to be first transmitted (e.g., by first-in first-out), the use of limited network resources may be favorably planned based on the first piece of configuration information, thereby improving the utilization rate of network resources, whilst ensuring that the data transmission follows the data transmission configurations corresponding to various types of data.

FIG. 1 shows a schematic diagram of example data transmission environment 100 in which some embodiments of the present disclosure can be implemented. Environment 100 includes first device 110, second device 120, and a plurality of data sources 130-1 to 130-N (hereinafter collectively referred to as data sources 130, where N is an integer greater than 1).

First device 110 may be a vehicle with a computing power or a device associated with the vehicle, such as a vehicle-mounted computing device or a computing device held by a user on the vehicle. Second device 120 may be a server for data processing, e.g., a personal computer, a tablet computer, a wearable device, a cloud server, a mainframe, and a distributed computing system.

Data sources 130 may be various data collecting devices associated with first device 110, e.g., a data collecting device installed on first device 110 or connected to first device 110. As an example, these data collecting devices include, but are not limited to, an alternating current sensor, a fuel sensor, an exhaust gas sensor, a pressure sensor, a GPS sensor, a radar sensor, an inertial sensor, an infrared sensor, a camera, a microphone, and the like.

First device 110 may receive a plurality of types of data from the plurality of data sources 130. As an example, the plurality of types of data may be classified into sensor data, multimedia data, and traffic data. For example, the sensor data may include data from the alternating current sensor, the fuel sensor, the exhaust gas sensor, the pressure sensor, and the like. The multimedia data may include data from the camera, the infrared sensor, the microphone, and the like. The traffic data may include data from the GPS sensor, the radar sensor, the inertial sensor, and the like.

First device 110 may transmit the received plurality of types of data to second device 120. How first device 110 transmits the received plurality of types of data to second device 120 will be specifically described below with reference to FIG. 2 to FIG. 4.

Figure 2:
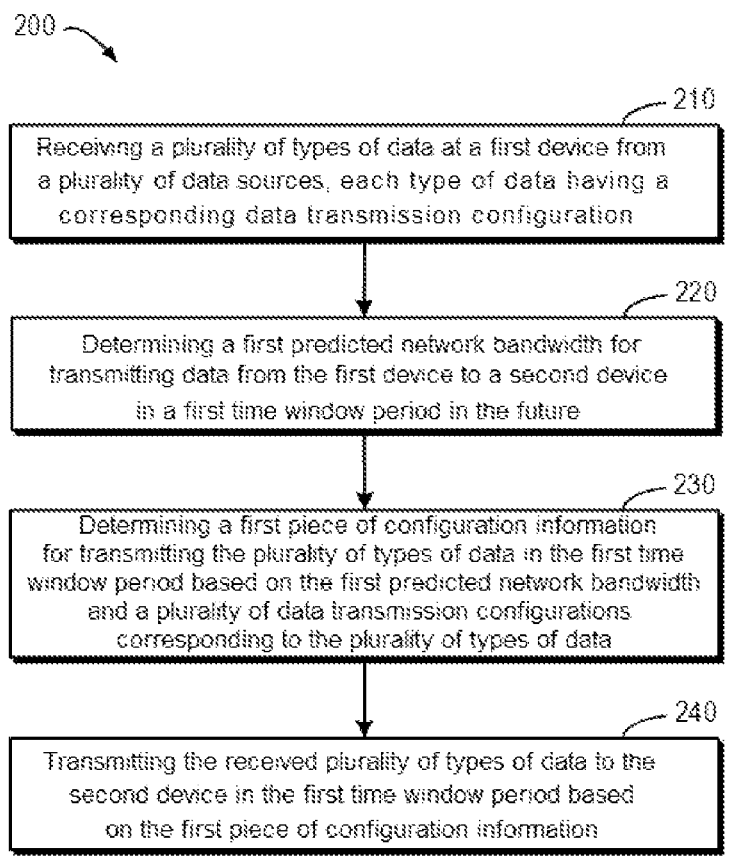
FIG. 2 shows a flowchart of an example method for data transmission according to some embodiments of the present disclosure.

FIG. 2 shows a flowchart of method 200 for data transmission according to some embodiments of the present disclosure. Method 200 may be implemented by first device 110 as shown in FIG. 1. Alternatively, method 200 may also be implemented by other entities other than first device 110. It should be understood that method 200 may further include additional steps that are not shown and/or may omit steps that are shown, and the scope of the present disclosure is not limited in this respect.

At 210, first device 110 receives a plurality of types of data from the plurality of data sources 130. As described above, the plurality of types of data includes, e.g., sensor data, multimedia data, and traffic data. In some embodiments, each type of data has a corresponding data transmission configuration. Such a data transmission configuration includes a receiving rate of the corresponding type of data, a valid period of the corresponding type of data, a duration during which the corresponding type of data is cacheable before being transmitted, and/or whether transmission of the corresponding type of data is disabled under a specific condition.

For example, a receiving rate of the sensor data is 3 Mb/min, a valid period of the sensor data is 15 minutes, a duration during which the sensor data is cacheable is 30 minutes, and transmission is disabled when first device 110 stops operation. A receiving rate of the multimedia data is 2 Mb/sec, a valid period of the multimedia data is 24 hours, a duration during which the multimedia data is cacheable is one week, and transmission is disabled when first device 110 stops operation. A receiving rate of the traffic data is 16 k/min, a valid period of the traffic data is 1 minute, a duration during which the traffic data is cacheable is 3 minutes, and transmission is disabled when first device 110 stops operation.

This is because the sensor data is often used for monitoring a vehicle state and providing maintenance recommendations. It has a small data volume, and is hardly required to be processed in time on an edge server or in a cloud. The multimedia data is usually used as a data set for artificial intelligence and other training. It has a large data flow and is not required to be processed in time on an edge server or in a cloud. The traffic data is usually used for monitoring real-time traffic. It has a small data volume, but is generated frequently. In addition, the traffic data is essential for monitoring real-time traffic, and is therefore required to be transmitted to an edge server or a cloud in a short time.

At 220, first device 110 determines a first predicted network bandwidth for transmitting data from first device 110 to second device 120 in a first time window period in the future. For example, first device 110 may determine the first predicted network bandwidth during the next 1 hour. In some embodiments, a size of a first time window period depends on a variability of a network environment. For example, when the network environment significantly changes, the first time window period may be shorter. When the network environment is stable, the first time window period may be longer.

First device 110 may determine the first predicted network bandwidth using various appropriate methods, such as an autoregressive method or a tree-based method. For example, first device 110 may determine the first predicted network bandwidth using a time series model (e.g., an Autoregressive Integrated Moving Average (ARIMA) model). The time series model determines the first predicted network bandwidth based on a past network environment. When the network environment is favorable, for example, when a signal is a simple combination of a linear trend with a periodic waveform, the time series model has favorable effects. In addition, the time series model may also work well in many cases where signal decomposition is more complex but time changes are stable.

In addition, first device 110 may also consider more factors to determine the first predicted network bandwidth more accurately. For example, if first device 110 can obtain a high-precision map and a base station location, such information may be combined with local information (e.g., a driving speed and a driving direction) to achieve more accurate predictions.

In some embodiments, first device 110 may also impose restrictions on a range of the first predicted network bandwidth, e.g., setting an upper limit and/or a lower limit of the first predicted network bandwidth, to ensure that the first predicted network bandwidth falls within a reasonable and feasible range.

At 230, first device 110 determines a first piece of configuration information for transmitting the plurality of types of data in the first time window period based on the first predicted network bandwidth and a plurality of data transmission configurations corresponding to the plurality of types of data. In some embodiments, when a data transmission configuration corresponding to each type of data includes the receiving rate and the valid period of the corresponding type of data, the first piece of configuration information may be determined by an approach to be described below. Determining the first piece of configuration information will be specifically described below with reference to FIG. 3, where FIG. 3 shows a schematic diagram of an example first piece of configuration information 300 according to some embodiments of the present disclosure.

Figure 3:
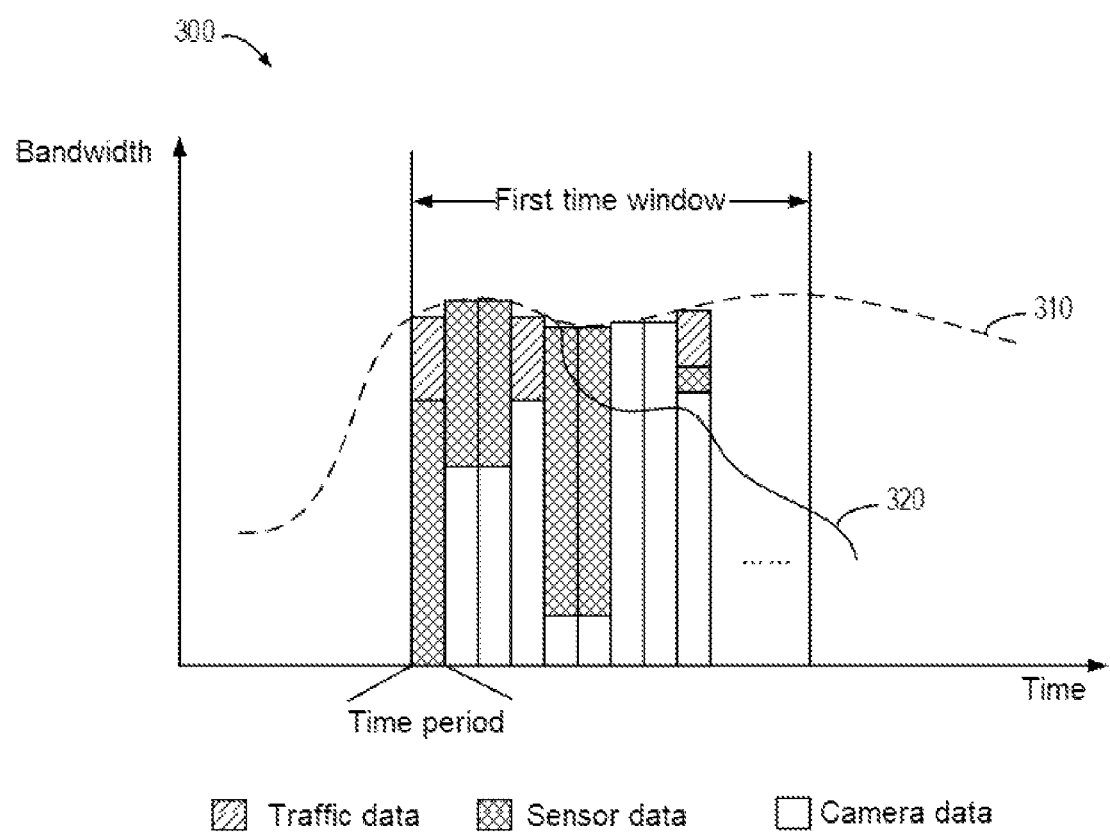
FIG. 3 shows a schematic diagram of an example first piece of configuration information according to some embodiments of the present disclosure.

As shown in FIG. 3, first device 110 may divide a first time window period into a plurality of time periods. The first time window period may be divided in any suitable manner. For example, assume that a valid period of traffic data is 5 minutes, and a valid period of sensor data is 15 minutes. Since 15 minutes is a multiple of 5 minutes, the first time window period may be divided into a plurality of time periods with a length of 5 minutes. As another example, assume that the valid period of the traffic data is 5 minutes, and the valid period of the sensor data is 7 minutes. In this case, the first time window period may be divided based on a common divisor of 5 minutes and 7 minutes (e.g., 1 minute). For example, assume that the valid period of the traffic data is 3 minutes, and the valid period of the sensor data is 7 minutes. Since 7 minutes is close to 6 minutes, which is a multiple of 3 minutes, the first time window period may be divided based on 3 minutes. Therefore, dividing a time window based on a data transmission configuration can be beneficial to reasonable division of the time window, and avoid dividing the time window into shorter time periods, thereby significantly reducing the scale of a linear planning problem to be described below.

Then, first device 110 may determine a group of data transmission tasks executable in the first time window period based on the plurality of time periods and the receiving rate and the valid period of each of the plurality of types of data. Each data transmission task is used for transmitting a data volume of the corresponding type received within a valid period of data of a corresponding type. For example, assuming that a receiving rate of the traffic data is 5 kb/min, and the valid period of the traffic data is 5 min, a data volume to be transmitted by a data transmission task of the traffic data is 5 kb/min*5 min=25 kb.

Further, first device 110 may determine the first piece of configuration information for executing at least part of data transmission tasks of the group of data transmission tasks in the first time window period based on a first predicted network bandwidth. The first piece of configuration information indicates at least one time period during which each data transmission task among the at least part of data transmission tasks will be executed and a network bandwidth to be consumed in the at least one time period. In FIG. 3, the first predicted network bandwidth is shown as dashed line 310. A block below dashed line 310 indicates data transmission of each type of data.

In some embodiments, a data transmission plan indicated by the first piece of configuration information is required to follow the data transmission configuration. In addition, the data transmission plan may also fill an idle network bandwidth with data having a large data volume and a long valid period (e.g., multimedia data).

In view of this, first device 110 may determine the first piece of configuration information to maximize the number of the at least part of data transmission tasks when the following constraints are satisfied: (1) a network bandwidth consumed in each time period among the plurality of time periods does not exceed a portion of the first predicted network bandwidth which corresponds to the time period; (2) each data transmission task among the at least part of data transmission tasks does not consume a network bandwidth outside a valid period corresponding to the data transmission task; and (3) each data transmission task among the at least part of data transmission tasks is completely executed in the first time window period.

More specifically, the above method may be converted into the following equation:

$$\max \Sigma x_{\{i,j\}}, i \in S,$$

Constraints (1)-(3) are:

$$\sum_i x_{\{i,j\}} \le Res_j, \tag{1}$$

$$x_{\{i,j\}} \begin{cases} = 0, \text{ if time period } j \text{ is outside a valid period corresponding to data transmission task } i \\ \ge 0, \text{ if time period } j \text{ is within the valid period corresponding to data transmission task } i \end{cases} \tag{2}$$

$$\sum_j x_{\{i,j\}} = J_i, i \in S \tag{3}$$

where $x_{\{i,j\}}$ denotes a network bandwidth consumed by data transmission task i in time period j, S denotes a group of data transmission tasks, $Res_j$ denotes a portion corresponding to time period j in the first predicted network bandwidth (e.g., an average available network bandwidth in time period j), and $J_i$ denotes a data volume to be transmitted by data transmission task i in the first time window period.

Through the above conversion and simplification of the original resource allocation problems, the network bandwidth consumed by each data transmission task in each time period is used as a decision variable, such that the complex resource allocation problem becomes a linear planning problem. The linear planning problem can favorably extend with the growth of data sources, and can be solved quickly.

At 240, first device 110 transmits the received plurality of types of data to second device 120 in the first time window period based on the first piece of configuration information. Thus, instead of allowing a low-level network controller to decide which pieces of data are to be first transmitted (e.g., by first-in first-out), the use of limited network resources may be favorably planned based on the first piece of configuration information, thereby improving the utilization rate of network resources, whilst ensuring that the data transmission follows the data transmission configurations corresponding to various types of data.

Determining the first piece of configuration information and performing data transmission based on the first piece of configuration information are described above. In some cases, the network bandwidth may also be regularly re-predicted, thereby regularly re-determining the configuration information for data transmission. For example, the configuration information may be re-determined every 15 minutes, despite that the configuration information is generated for data transmission in the next 1 hour. This redundancy provides additional stability for data transmission.

In addition, because the configuration information is determined based on a predicted network bandwidth, in some cases, there may be a significant difference between an actual network bandwidth and the predicted network bandwidth. In this case, it is necessary to re-predict the network bandwidth, such that it is necessary to re-determine the configuration information for data transmission. For example, if the data transmission based on the configuration information is completed 15 minutes ahead of time, it is necessary to re-determine the configuration information to correct this deviation.

Figure 4:
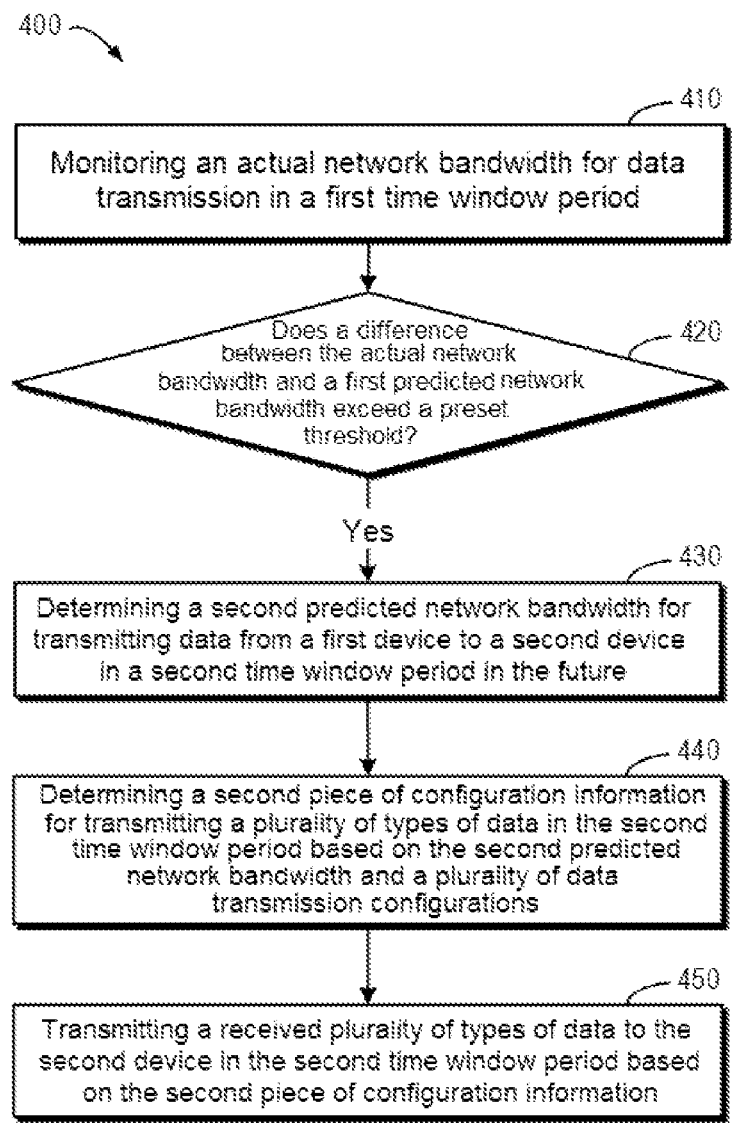
FIG. 4 shows a flowchart of an example method for data transmission according to some embodiments of the present disclosure.

A process of re-determining the configuration information for data transmission will be specifically described below with reference to FIG. 4. FIG. 4 shows a flowchart of example method 400 for data transmission according to some embodiments of the present disclosure.

At 410, first device 110 may monitor an actual network bandwidth for data transmission in a first time window period. For example, the actual network bandwidth may be shown as solid line 320 in FIG. 3. At 420, first device 110 may determine whether a difference between the actual network bandwidth and a first predicted network bandwidth exceeds a preset threshold. If the difference between the actual network bandwidth and the first predicted network bandwidth exceeds a preset threshold (e.g., as shown in FIG. 3, actual network bandwidth (solid line 320) significantly deviates from first predicted network bandwidth (dashed line 310)), at 430, first device 110 may determine a second predicted network bandwidth for transmitting data from the first device to a second device in a second time window period in the future. At 440, first device 110 may determine a second piece of configuration information for transmitting a plurality of types of data in the second time window period based on the second predicted network bandwidth and a plurality of data transmission configurations. At 450, first device 110 may transmit a received plurality of types of data to the second device in the second time window period based on the second piece of configuration information. This flexible self-adjustment mechanism can be used to ensure full utilization of the network bandwidth.

Figure 5:
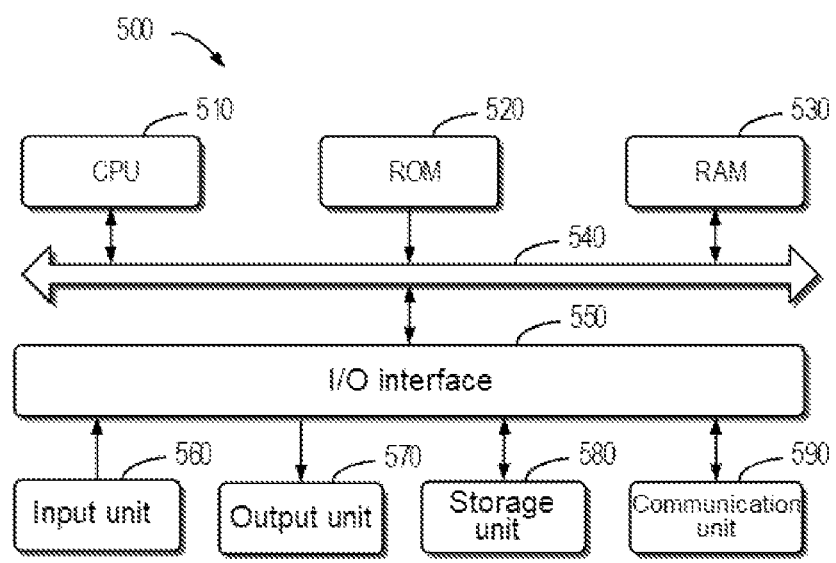
FIG. 5 shows a schematic block diagram of an example device that may be configured to implement embodiments of the present disclosure.

FIG. 5 shows a schematic block diagram of example device 500 that may be configured to implement embodiments of the present disclosure. For example, first device 110 as shown in FIG. 1 may be implemented by device 500. As shown in the figure, device 500 includes central processing unit (CPU) 510, which may execute various appropriate actions and processes in accordance with computer program instructions stored in read-only memory (ROM) 520 or computer program instructions loaded into random-access memory (RAM) 530 from storage unit 580. RAM 530 may further store various programs and data required by operations of device 500. CPU 510, ROM 520, and RAM 530 are connected to each other through bus 540. Input/output (I/O) interface 550 is also connected to bus 540.

A plurality of components in device 500 is connected to I/O interface 550, including: input unit 560, such as a keyboard and a mouse; output unit 570, such as various types of displays and speakers; storage unit 580, such as a magnetic disk and an optical disk; and communication unit 590, such as a network card, a modem, and a wireless communication transceiver. Communication unit 590 allows device 500 to exchange information/data with other devices via a computer network, e.g., the Internet, and/or various telecommunication networks.

The processes described above, such as method 200 and method 400, may be executed by CPU 510. For example, in some embodiments, method 200 and method 400 may be implemented as a computer software program that is tangibly included in a machine-readable medium, such as storage unit 580. In some embodiments, a part or all of the computer program may be loaded and/or installed onto device 500 via ROM 520 and/or communication unit 590. When the computer program is loaded into RAM 530 and executed by CPU 510, one or more actions of method 200 and method 400 described above may be executed.

Illustrative embodiments of the present disclosure include a method, an apparatus, a system, and/or a computer program product. The computer program product may include a computer-readable storage medium, which carries computer-readable program instructions for executing various aspects of the present disclosure.

The computer-readable storage medium may be a tangible device that can hold and store instructions for use by an instruction executing device. An example of the computer-readable storage medium may include, but is not limited to: an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random-access memory (SRAM), a portable compact disk read-only memory (CD-ROM), a digital versatile disk (DVD), a memory stick, a floppy disk, a mechanical coding device, e.g., a punched card storing instructions thereon or a protruding structure within a groove, and any suitable combination of the above. The computer-readable storage medium used here is not construed as a transitory signal itself, such as a radio wave or other freely propagating electromagnetic waves, an electromagnetic wave propagating through a waveguide or other transmission media (e.g., an optical pulse through an optical cable), or an electrical signal transmitted through a wire.

The computer-readable program instructions described here may be downloaded from a computer-readable storage medium to various computing/processing devices, or downloaded to an external computer or external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or network interface in each computing/processing device receives the computer-readable program instructions from the network, and forwards the computer-readable program instructions for storage in a computer-readable storage medium in each computing/processing device.

The computer program instructions for executing the operations of the present disclosure may be an assembly instruction, an instruction set architecture (ISA) instruction, a machine instruction, a machine-related instruction, microcode, a firmware instruction, state setting data, or source code or object code written in any combination of one or more programming languages. The programming languages include object-oriented programming languages, such as Java, Smalltalk, and C++, and also include conventional procedural programming languages, such as "C" language or similar programming languages. The computer-readable program instructions may be completely executed on a user's computer, partially executed on a user's computer, executed as a stand-alone software package, partially executed on a user's computer and partially executed on a remote computer, or completely executed on a remote computer or server. When a remote computer is involved, the remote computer may be connected to a user's computer through any network, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to the flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general-purpose computer, a special-purpose computer, or other programmable data processing apparatuses to produce a machine, such that the instructions, when executed by the processing unit of the computer or other programmable data processing apparatuses, generate an apparatus implementing the functions/actions specified in one or more blocks in the flowcharts and/or block diagrams. The computer-readable program instructions may also be stored in a computer-readable storage medium. The instructions cause a computer, a programmable data processing apparatus, and/or other devices to operate in a particular manner, such that the computer-readable medium storing the instructions includes a manufactured product, including instructions for implementing various aspects of the functions/actions specified in one or more blocks in the flowcharts and/or block diagrams.

The computer-readable program instructions may also be loaded onto a computer, other programmable data processing apparatuses, or other devices, such that a series of operation steps are performed on the computer, other programmable data processing apparatuses, or other devices to produce a computer implemented process. Thus, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the system, the method, and the computer program product according to a plurality of embodiments of the present disclosure. In this regard, each of the blocks in the flowcharts or block diagrams may represent a module, a program segment, or an instruction portion, said module, program segment, or instruction portion including one or more executable instructions for implementing specified logic functions. In some alternative implementations, the functions denoted in the blocks may occur in a sequence different from the sequences shown in the figures. For example, any two blocks in succession may be executed substantially in parallel, or they may sometimes be executed in a reverse sequence, depending on the functions involved. It should also be noted that each block in the block diagrams and/or flowcharts as well as a combination of blocks in the block diagrams and/or flowcharts may be implemented using a dedicated hardware-based system executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various disclosed embodiments. The selection of terms used herein is intended to best explain the principles and practical applications of the embodiments or technological improvements on technologies in the market, so as allow persons of ordinary skill in the art to understand the embodiments disclosed herein.

What is claimed is:

1. A method for data transmission, comprising:
    receiving a plurality of types of data at a first device from a plurality of data sources, each type of data having a corresponding data transmission configuration;
    determining a first predicted network bandwidth for transmitting data from the first device to a second device in a first time window period in the future;
    determining a first piece of configuration information for transmitting the plurality of types of data in the first time window period based on the first predicted network bandwidth and a plurality of data transmission configurations corresponding to the plurality of types of data; and
    transmitting the received plurality of types of data to the second device in the first time window period based on the first piece of configuration information;
    wherein determining the first piece of configuration information comprises:
    dividing the first time window period into a plurality of time periods;
    determining a group of data transmission tasks executable in the first time window period based on the plurality of time periods; and
    solving a resource allocation optimization problem based on maximization of data transmission over the plurality of time periods to determine a manner in which two or more of the group of data transmission tasks are to be performed across the plurality of time periods subject to a plurality of constraints including at least network bandwidth consumption constraints relative to respective portions of the first predicted network bandwidth for respective ones of the plurality of time periods, the network bandwidth consumption constraints comprising at least a first network bandwidth consumption constraint for a first one of the plurality of time periods and a second network bandwidth consumption constraint, different than the first network bandwidth consumption constraint, for a second one of the plurality of time periods;
    wherein transmitting the received plurality of types of data to the second device in the first time window period based on the first piece of configuration information comprises transmitting the received plurality of types of data in accordance with one or more results of the solving of the resource allocation optimization problem.

2. The method according to claim 1, wherein a data transmission configuration corresponding to each type of data comprises at least one of following items:
    a receiving rate of the type of data;
    a valid period of the type of data;
    a duration during which the type of data is cacheable before being transmitted; and
    whether transmission of the type of data is disabled under a specific condition.

3. The method according to claim 1, wherein a data transmission configuration corresponding to each type of data comprises a receiving rate of the type of data and a valid period of the type of data, and determining the first piece of configuration information comprises:
    determining the group of data transmission tasks executable in the first time window period based on the plurality of time periods and the receiving rate and the valid period of each of the plurality of types of data, wherein each data transmission task is used for transmitting a data volume of the corresponding type received within a valid period of data of a corresponding type; and
    determining the first piece of configuration information for executing at least part of data transmission tasks of the group of data transmission tasks in the first time window period based on the first predicted network bandwidth,
    wherein the first piece of configuration information indicates at least one time period during which each data transmission task among the at least part of data transmission tasks will be executed and a network bandwidth to be consumed in the at least one time period.

4. The method according to claim 3, wherein determining the first piece of configuration information for executing the at least part of data transmission tasks in the first time window period comprises:
    determining the first piece of configuration information by solving the resource allocation optimization problem to maximize the number of the at least part of data transmission tasks when the following constraints of the plurality of constraints are satisfied:
    a network bandwidth consumed in each time period among the plurality of time periods does not exceed a portion of the first predicted network bandwidth which corresponds to the time period;
    each data transmission task among the at least part of data transmission tasks does not consume a network bandwidth outside a valid period corresponding to the data transmission task; and
    each data transmission task among the at least part of data transmission tasks is completely executed in the first time window period.

5. The method according to claim 1, wherein the method further comprises:
    monitoring an actual network bandwidth for data transmission in the first time window period; and
    determining, in response to a difference between the actual network bandwidth and the first predicted network bandwidth exceeding a preset threshold, a second predicted network bandwidth for transmitting data from the first device to the second device in a second time window period in the future;

determining a second piece of configuration information for transmitting the plurality of types of data in the second time window period based on the second predicted network bandwidth and the plurality of data transmission configurations; and transmitting the received plurality of types of data to the second device in the second time window period based on the second piece of configuration information.

6. The method according to claim 1, wherein the first device is a vehicle, and the second device is a server for data processing.

7. The method according to claim 1, wherein the plurality of types of data comprises sensor data, multimedia data, and traffic data.

8. An electronic device, comprising:
at least one processing unit; and
at least one memory, the at least one memory being coupled to the at least one processing unit and storing instructions for execution by the at least one processing unit, the instructions, when executed by the at least one processing unit, causing the electronic device to execute actions, the actions comprising:
receiving a plurality of types of data at a first device from a plurality of data sources, each type of data having a corresponding data transmission configuration;
determining a first predicted network bandwidth for transmitting data from the first device to a second device in a first time window period in the future;
determining a first piece of configuration information for transmitting the plurality of types of data in the first time window period based on the first predicted network bandwidth and a plurality of data transmission configurations corresponding to the plurality of types of data; and
transmitting the received plurality of types of data to the second device in the first time window period based on the first piece of configuration information;
wherein determining the first piece of configuration information comprises:
dividing the first time window period into a plurality of time periods;
determining a group of data transmission tasks executable in the first time window period based on the plurality of time periods; and
solving a resource allocation optimization problem based on maximization of data transmission over the plurality of time periods to determine a manner in which two or more of the group of data transmission tasks are to be performed across the plurality of time periods subject to a plurality of constraints including at least network bandwidth consumption constraints relative to respective portions of the first predicted network bandwidth for respective ones of the plurality of time periods, the network bandwidth consumption constraints comprising at least a first network bandwidth consumption constraint for a first one of the plurality of time periods and a second network bandwidth consumption constraint, different than the first network bandwidth consumption constraint, for a second one of the plurality of time periods;
wherein transmitting the received plurality of types of data to the second device in the first time window period based on the first piece of configuration information comprises transmitting the received plurality of types of data in accordance with one or more results of the solving of the resource allocation optimization problem.

9. The electronic device according to claim 8, wherein a data transmission configuration corresponding to each type of data comprises at least one of following items:
a receiving rate of the type of data;
a valid period of the type of data;
a duration during which the type of data is cacheable before being transmitted; and
whether transmission of the type of data is disabled under a specific condition.

10. The electronic device according to claim 8, wherein a data transmission configuration corresponding to each type of data comprises a receiving rate of the type of data and a valid period of the type of data, and determining the first piece of configuration information comprises:
determining the group of data transmission tasks executable in the first time window period based on the plurality of time periods and the receiving rate and the valid period of each of the plurality of types of data,
wherein each data transmission task is used for transmitting a data volume of the corresponding type received within a valid period of data of a corresponding type; and
determining the first piece of configuration information for executing at least part of data transmission tasks of the group of data transmission tasks in the first time window period based on the first predicted network bandwidth,
wherein the first piece of configuration information indicates at least one time period during which each data transmission task among the at least part of data transmission tasks will be executed and a network bandwidth to be consumed in the at least one time period.

11. The electronic device according to claim 10, wherein determining the first piece of configuration information for executing the at least part of data transmission tasks in the first time window period comprises:
determining the first piece of configuration information by solving the resource allocation optimization problem to maximize the number of the at least part of data transmission tasks when the following constraints of the plurality of constraints are satisfied:
a network bandwidth consumed in each time period among the plurality of time periods does not exceed a portion of the first predicted network bandwidth which corresponds to the time period;
each data transmission task among the at least part of data transmission tasks does not consume a network bandwidth outside a valid period corresponding to the data transmission task; and
each data transmission task among the at least part of data transmission tasks is completely executed in the first time window period.

12. The electronic device according to claim 8, wherein the actions further comprise:
monitoring an actual network bandwidth for data transmission in the first time window period; and
determining, in response to a difference between the actual network bandwidth and the first predicted network bandwidth exceeding a preset threshold,
a second predicted network bandwidth for transmitting data from the first device to the second device in a second time window period in the future;

determining a second piece of configuration information for transmitting the plurality of types of data in the second time window period based on the second predicted network bandwidth and the plurality of data transmission configurations; and transmitting the received plurality of types of data to the second device in the second time window period based on the second piece of configuration information.

13. The electronic device according to claim 8, wherein the first device is a vehicle, and the second device is a server for data processing.

14. The electronic device according to claim 8, wherein the plurality of types of data comprises sensor data, multimedia data, and traffic data.

15. A computer program product, the computer program product being tangibly stored on a non-transitory computer-readable medium and comprising machine-executable instructions, the machine-executable instructions, when executed by a machine, causing the machine to execute steps of a method for data transmission, the method comprising:

receiving a plurality of types of data at a first device from a plurality of data sources, each type of data having a corresponding data transmission configuration;

determining a first predicted network bandwidth for transmitting data from the first device to a second device in a first time window period in the future;

determining a first piece of configuration information for transmitting the plurality of types of data in the first time window period based on the first predicted network bandwidth and a plurality of data transmission configurations corresponding to the plurality of types of data; and transmitting the received plurality of types of data to the second device in the first time window period based on the first piece of configuration information;

wherein determining the first piece of configuration information comprises:

dividing the first time window period into a plurality of time periods;

determining a group of data transmission tasks executable in the first time window period based on the plurality of time periods; and solving a resource allocation optimization problem based on maximization of data transmission over the plurality of time periods to determine a manner in which two or more of the group of data transmission tasks are to be performed across the plurality of time periods subject to a plurality of constraints including at least network bandwidth consumption constraints relative to respective portions of the first predicted network bandwidth for respective ones of the plurality of time periods, the network bandwidth consumption constraints comprising at least a first network bandwidth consumption constraint for a first one of the plurality of time periods and a second network bandwidth consumption constraint, different than the first network bandwidth consumption constraint, for a second one of the plurality of time periods;

wherein transmitting the received plurality of types of data to the second device in the first time window period based on the first piece of configuration information comprises transmitting the received plurality of types of data in accordance with one or more results of the solving of the resource allocation optimization problem.

16. The computer program product according to claim 15, wherein a data transmission configuration corresponding to each type of data comprises at least one of following items:

a receiving rate of the type of data;

a valid period of the type of data;

a duration during which the type of data is cacheable before being transmitted; and whether transmission of the type of data is disabled under a specific condition.

17. The computer program product according to claim 15, wherein a data transmission configuration corresponding to each type of data comprises a receiving rate of the type of data and a valid period of the type of data, and determining the first piece of configuration information comprises:

determining the group of data transmission tasks executable in the first time window period based on the plurality of time periods and the receiving rate and the valid period of each of the plurality of types of data, wherein each data transmission task is used for transmitting a data volume of the corresponding type received within a valid period of data of a corresponding type; and determining the first piece of configuration information for executing at least part of data transmission tasks of the group of data transmission tasks in the first time window period based on the first predicted network bandwidth, wherein the first piece of configuration information indicates at least one time period during which each data transmission task among the at least part of data transmission tasks will be executed and a network bandwidth to be consumed in the at least one time period.

18. The computer program product according to claim 17, wherein determining the first piece of configuration information for executing the at least part of data transmission tasks in the first time window period comprises:

determining the first piece of configuration information by solving the resource allocation optimization problem to maximize the number of the at least part of data transmission tasks when the following constraints of the plurality of constraints are satisfied:

a network bandwidth consumed in each time period among the plurality of time periods does not exceed a portion of the first predicted network bandwidth which corresponds to the time period;

each data transmission task among the at least part of data transmission tasks does not consume a network bandwidth outside a valid period corresponding to the data transmission task; and each data transmission task among the at least part of data transmission tasks is completely executed in the first time window period.

19. The computer program product according to claim 15, wherein the method further comprises:

monitoring an actual network bandwidth for data transmission in the first time window period; and determining, in response to a difference between the actual network bandwidth and the first predicted network bandwidth exceeding a preset threshold, a second predicted network bandwidth for transmitting data from the first device to the second device in a second time window period in the future;

determining a second piece of configuration information for transmitting the plurality of types of data in the second time window period based on the second predicted network bandwidth and the plurality of data transmission configurations; and transmitting the received plurality of types of data to the second device in the second time window period based on the second piece of configuration information.

20. The computer program product according to claim 15, wherein the first device is a vehicle, and the second device is a server for data processing, and further wherein the plurality of types of data comprises sensor data, multimedia data, and traffic data.

* * * * *